Nov. 10, 1953     L. H. HEUER     2,658,247
SNAP-IN DEFORMABLE CLIP HOLDER
Filed March 10, 1949
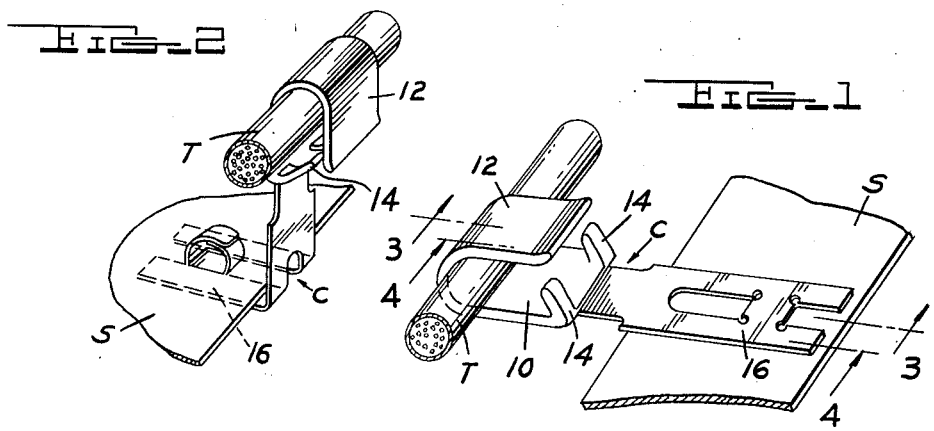
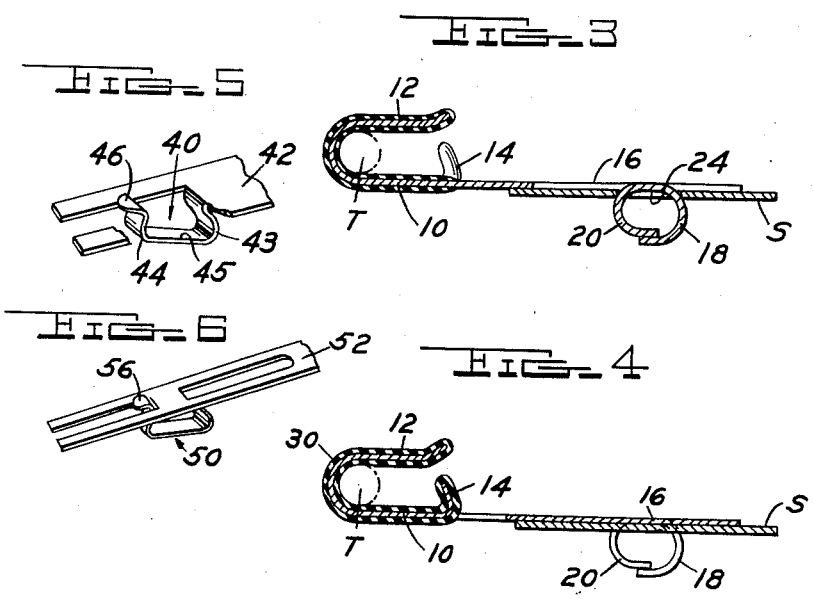
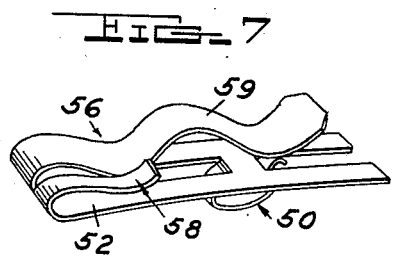
INVENTOR.
LAWRENCE H. HEUER
BY
ATTORNEYS Patented Nov. 10, 1953

2,658,247

UNITED STATES PATENT OFFICE 2,658,247

SNAP-IN DEFORMABLE CLIP HOLDER

Lawrence H. Heuer, Detroit, Mich., assignor to Automotive Spring Corporation, Detroit, Mich., a corporation of Michigan Application March 10, 1949, Serial No. 80,743

1 Claim. (Cl. 24—73)

This invention relates to a clip member for securing wires, tubes, rods and the like to a supporting structure.

This invention is particularly useful for installation in and around motor vehicles, airplanes, and similar constructions, where it is often necessary to have one or more tubes or wires follow a certain frame member for some distance, as, for example, fuel lines, air lines, tube indicator devices, wires, cables and tubes for ignition, control and lighting systems.

It is an object of the present invention to provide a fastening clip which may be applied to a frame member or to a holding plate by simply snapping it in place without the necessity of spot welding the clip to the frame.

Present practice for the most part calls for spot welding these carrying clips to the body or frame of a vehicle and this operation must be done before the enameling, bonderizing and other surface treatments are given to the metal. The particular clip in question is provided with a rubber coating at the carrying end and these surface treating processes are detrimental to the rubber coating either because of the material used or the heat used in the treating process.

With the present invention the clip may be snapped into place after the frame or body has been completely painted and treated for rust proofing, etc.

Another problem in connection with these clips is that the holding portion must be of such low resilience that it may be readily formed into place, preferably by the fingers and for the purpose of holding the particular tubes or wires in tight relation to prevent chaffing and rattling.

Briefly the invention here consists of providing a clip with a soft holding end rubber covered and a resilient or spring like clipping end which can hold the clip on the supporting member.

Additional objects and features of the invention will be apparent in the following description and claim.

Drawings accompany this application and the various views thereof may be briefly described as follows:

Figure 1, a perspective view of the clip in assembled position.

Figure 2, a perspective view of a clip which has been formed into an L-shaped clip.

Figure 3, a sectional view on line 3—3 of Figure 1.

Figure 4, a sectional view on line 4—4 of Figure 1.

Figure 5, a modified type of clip means at the fastening end.

Figure 6, a further modified showing of the clip formation.

Figure 7, a view of a clip used for double line, double size holding.

In the drawings, the supporting member is represented by S and the clip generally designated by C. The rubber coated holding end 10 of the clip has a portion 12 bent back upon itself and rubber coated. Struck out of the sides of the clip are tabs 14 which project upwardly toward the portion 12 and which subsequently serve to close the loop as the portion 12 is pushed downwardly under the tabs 14. The tube T is shown held by the end of the clip. The fastening end 16 of the clip has two tabs 18 and 20 (Fig. 3) struck therefrom with ends overlapping to form a closed expansible-contractible loop on one side of the fastening end.

The loop cooperates with an aperture 24 in the supporting member S, in the sense that the loop may be compressed to pass through the aperture and will then expand to hold the clip firmly on the supporting member. It is important that the loop be substantially circular so that the legs will wedge outwardly against the sides of the retaining hole to prevent rattling.

With this arrangement it is essential that the end 16 of the clip be tempered to provide a spring-like characteristic to the tabs 18 and 20. The spring clip is therefore formed as shown in Figure 1 or as shown in Figure 2 to the desired shape and then the supporting end or fastening end 16 is heat treated to provide the necessary resilience. Subsequently, the end 10 may be coated with plastic or rubber 30 to provide the sound deadening or clipping characteristics required at the holding end of the clip.

Since this holding end 10 remains soft it is possible to press the portion 12 down under the tabs 14 to close the holding loop.

With this type of clip it is necessary only to provide the proper size holes in the frame or body after which the body may be painted, bonderized or otherwise treated until ready for assembly. Then the clips above described may be readily snapped in place where they will await the installation of the continuous members which they are to support. It will be seen, of course, that the particular clip described is a replaceable unit; that is, the clip may be removed after being once installed and replaced if there is any reason this should be desirable.

In Figure 5 there is shown a modified type of fastening clip which is formed of one tab 40 struck from a piece 42 and shaped to have one loop 43 at one side and a second loop 44 at the other side, the connecting metal 45 angling toward the base piece 42. The end of the tab 40 is shaped at 46 to provide a locking groove at the base of loop 44. The end 46 also permits application of a tool for compressing the clip for removal.

Figure 6 illustrates a tab 50 which is similar to 40 except that it is struck from behind and bent forward to form the loop. The end of the strip 52 is slotted to provide clearance for the end 56 of the tab. In Figure 5 it will be noted the tab 40 is formed from the material of the end slot.

Figure 7 illustrates a modified type of holding clip in which parallel bands 56 and 58 are formed on one side of the clip 52. Band 56 is large and is provided with two loops, the second loop 59 being the functional holding loop for relatively large cable. Band 58 is small and has one loop for a small cable or tube. This clip may be used advantageously for double line holding of large and small cable or tube. It may be entirely tempered for installations where noise is avoided by proper resilience and where the nature of the cable or line is such that a rubber coating is unnecessary.

It will thus be seen that I have provided a relatively inexpensive clip which is readily adapted to partial tempering for the spring clip portion and which is especially adapted to easy and fast insertion in a completed body or chassis.

What I claim is:

A fastening member for wires, tubes and the like comprising a strip of metal of flat rectangular shape, one end of which is soft and readily deformable and the other end of which has spring characteristics, the soft end being formed back upon itself to provide an open hook, tabs struck from the sides of the strip extending toward the end of the hook, tabs struck from the center of the other end of said strip curved away and then toward each other to an overlapping relation to form a spring loop axially transverse of said strip, and a coating of sound and electrical insulative material such as rubber at the hooked end of the strip covering the hook and side tabs.

LAWRENCE H. HEUER.

References Cited in the file of this patent

UNITED STATES PATENTS

| Number | Name | Date |
|---|---|---|
| 328,019 | Fowler | Oct. 13, 1885 |
| 363,550 | Sedgwick | May 24, 1887 |
| 656,196 | Lovejoy | Aug. 21, 1900 |
| 1,605,845 | King | Nov. 2, 1926 |
| 1,739,057 | Bock | Dec. 10, 1929 |
| 1,767,653 | Davis | June 24, 1930 |
| 1,873,881 | Hall | Aug. 23, 1932 |
| 1,993,734 | Edelheit | Mar. 12, 1935 |
| 2,080,769 | Fitts | May 18, 1937 |
| 2,246,078 | Rohn | June 17, 1941 |
| 2,278,691 | Cotter | Apr. 7, 1942 |
| 2,331,098 | White | Oct. 5, 1943 |
| 2,340,711 | Tinnerman | Feb. 1, 1944 |